United States Patent
Watanabe

(10) Patent No.: US 11,208,573 B2
(45) Date of Patent: Dec. 28, 2021

(54) COATING COMPOSITION AND LAMINATE

(71) Applicant: Nissin Chemical Industry Co., Ltd., Echizen (JP)

(72) Inventor: Kentaro Watanabe, Echizen (JP)

(73) Assignee: NISSIN CHEMICAL INDUSTRY CO., LTD., Echizen (JP)

(*) Notice: Subject to any disclaimer, the term of this patent is extended or adjusted under 35 U.S.C. 154(b) by 83 days.

(21) Appl. No.: 16/589,323

(22) Filed: Oct. 1, 2019

(65) Prior Publication Data

US 2020/0102473 A1  Apr. 2, 2020

(30) Foreign Application Priority Data

Oct. 1, 2018  (JP) .............................. JP2018-186635

(51) Int. Cl.

| | | |
|---|---|---|
| *C09D 175/04* | (2006.01) | |
| *C09D 5/02* | (2006.01) | |
| *C09D 7/40* | (2018.01) | |
| *C09D 133/12* | (2006.01) | |
| *C09D 183/04* | (2006.01) | |
| *C09D 151/08* | (2006.01) | |

(52) U.S. Cl.
CPC ........... *C09D 175/04* (2013.01); *C09D 5/022* (2013.01); *C09D 7/66* (2018.01); *C09D 133/12* (2013.01); *C09D 151/085* (2013.01); *C09D 183/04* (2013.01)

(58) Field of Classification Search
None
See application file for complete search history.

(56) References Cited

U.S. PATENT DOCUMENTS

| | | | | |
|---|---|---|---|---|
| 4,571,417 A * | 2/1986 | Thoma | ................. | C09D 175/04 |
| | | | | 525/63 |
| 5,476,912 A * | 12/1995 | Hosoi | ................. | C08G 81/024 |
| | | | | 526/279 |
| 2010/0310882 A1* | 12/2010 | Ogawa | ................. | C14C 11/006 |
| | | | | 428/423.4 |
| 2015/0125500 A1* | 5/2015 | Watanabe | ............. | C08G 77/20 |
| | | | | 424/401 |
| 2016/0177408 A1* | 6/2016 | Watanabe | ............. | C14C 11/006 |
| | | | | 428/423.4 |
| 2018/0163074 A1* | 6/2018 | Hui | .......................... | C08K 3/26 |

FOREIGN PATENT DOCUMENTS

JP  2013-67787 A  4/2013

OTHER PUBLICATIONS

Brochure on SYLOID matting agents by Grace Materials Technologies, 20 pages, 2013. (Year: 2013).*

* cited by examiner

*Primary Examiner* — Robert S Loewe
(74) *Attorney, Agent, or Firm* — Westerman, Hattori, Daniels and Adrian, LLP

(57) ABSTRACT

A coating composition contains: (A) 60 to 99% by weight of a urethane-based resin emulsion having film-forming ability in terms of a solid content ratio; and (B) 1 to 40% by weight of a silicone-acrylic graft copolymer resin emulsion having an average particle size of 180 nm or less in terms of a solid content ratio, wherein a weight ratio of a polyorganosiloxane represented by a specific chemical formula to an acrylic acid ester unit or a methacrylic acid ester unit is 30:70 to 99:1.

10 Claims, No Drawings

COATING COMPOSITION AND LAMINATE

CROSS-REFERENCE TO RELATED APPLICATION

This non-provisional application claims priority under 35 U.S.C. § 119(a) on Patent Application No. 2018-186635 filed in Japan on Oct. 1, 2018, the entire contents of which are hereby incorporated by reference.

TECHNICAL FIELD

The present invention relates to a coating composition, and more particularly to an emulsion-type coating composition with which the surface of a substrate is coated to allow maintenance of transparency and imparting of slidability. The present invention also relates to a laminate on which a film formed of the coating composition is formed.

BACKGROUND ART

In recent years, in the field of coating agents, the transfer of dispersion media from organic solvent systems to water systems has progressed in terms of environmental problems. Urethane-based, acrylic-based, and vinyl chloride-based emulsions have excellent film-forming ability, and are widely used as a coating agent.

Silicone-based resins have been known as resins capable of imparting slidability to a substrate. However, if the silicone-based resins are used as the coating agent, the silicone-based resins cause a problem such as whitening of a coated film.

Therefore, attempts have been made to use a mixture of urethane-based, acrylic-based, or vinyl chloride-based emulsion having film-forming ability and a silicone-based resin as the coating agent. However, in reality, the mixture cannot exhibit the slidability of the silicone-based resin, or causes deteriorated performance of the original urethane-based, acrylic-based, or vinyl chloride-based emulsion, which does not provide satisfactory performance.

The present inventors disclose that a coating agent obtained by mixing a urethane-based, acrylic-based, or vinyl chloride-based emulsion and a silicone-based resin can impart water repellency to a substrate in JP-A 2013-67787 (Patent Document 1). However, there is room for improvement in slidability and transparency of a coated film.

CITATION LIST

Patent Document JP-A 2013-67787

SUMMARY OF THE INVENTION

The present invention has been made in view of the above circumstances, and it is an object of the present invention to provide au emulsion-type coating composition to which slidability of silicone is effectively imparted while transparency is maintained when the emulsion-type coating composition is mixed with a urethane-based emulsion, and a laminate on which a film of the emulsion-type coating composition is formed.

As a result of intensive studies to achieve the above object, the present inventors have developed a coating composition obtained by blending a urethane-based emulsion having film-forming ability and a specific silicone-acrylic graft copolymer resin emulsion in a predetermined ratio.

Accordingly, the present invention provides the following coating composition and laminate.

1. A coating composition comprising:
    (A) 60 to 99% by weight of a urethane-based resin emulsion having film-forming ability in terms of a solid content ratio; and
    (B) 1 to 40% by weight of a silicone-acrylic graft copolymer resin emulsion having an average particle size of 180 nm or less in terms of a solid content ratio, wherein a weight ratio of a polyorganosiloxane represented by the following general formula (1) to an acrylic acid ester unit or a methacrylic acid ester unit is 30:70 to 99:1:

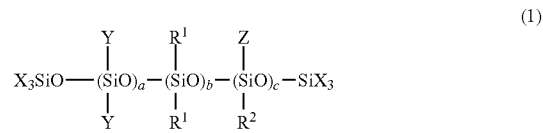
(1)

wherein $R^1$ is the same or different substituted or unsubstituted monovalent hydrocarbon group of 1 to 20 carbon atoms, $R^2$ is a mercapto, acryloxy or methacryloxy group-substituted alkyl group having 1 to 6 carbon atoms, or vinyl group, X is the same or different substituted or unsubstituted monovalent hydrocarbon group of 1 to 20 carbon atoms, an alkoxy group having 1 to 20 carbon atoms, or a hydroxyl group, Y is the same or different group represented by X or $-[O-Si(X)_2]_d-X$, at least two of X and Y being hydroxyl groups, Z is an alkyl group having 1 to 4 carbon atoms, an alkoxy group having 1 to 4 carbon atoms, or a hydroxyl group, a is a number of 0 to 1,000, b is a positive number of 100 to 10,000; c is a positive number of 1 to 10, and d is a positive number of 1 to 1,000.

2. The coating composition according to the above 1, wherein the monovalent hydrocarbon group of $R^1$ and X each is a straight, branched or cyclic alkyl group having 1 to 20 carbon atoms or aryl group having 6 to 20 carbon atoms in the general formula (1).
3. The coating composition according to the above 1, wherein an average particle diameter of the silicone-acrylic graft copolymer resin emulsion (B) is 50 to 180 nm.
4. The coating composition according to the above 1, wherein the silicone-acrylic graft copolymer resin emulsion (B) is an emulsion graft copolymer of (b1) a polyorganosiloxane having an average particle size of 180 nm or less, and represented by the general formula (1), (b2) an acrylic acid ester monomer or a (meth)acrylic acid ester monomer, and (b3) a functional group-containing monomer copolymerizable therewith.
5. The coating composition according to the above 4, wherein the average particle size of the polyorganosiloxane represented by the general formula (1) is 50 to 180 nm.
6. The coating composition according to the above 1, wherein a haze increase rate when the coating composition is applied to a substrate is 1000% or less per a haze value of the substrate before the application.
7. The coating composition according to the above 1, wherein the coating composition is used for coating a surface of the substrate.
8. A laminate including a film of the coating composition according to any one of the above 1 to 7 formed on one surface or both surfaces of a substrate.

9. The laminated according to the above 8, wherein the substrate is a plastic selected from polycarbonate, polystyrene, polyethylene terephthalate, polyvinyl chloride, polyester, cellulose, diethylene glycol bisallyl carbonate polymer, acrylonitrile-butadiene-styrene polymer, poly(meth)acrylic ester, polyurethane, and epoxy resin.

10. The laminate according to the above 8, wherein the substrate is glass selected from soda lime glass, quartz glass, lead glass, borosilicate glass, and alkali-free glass.

11. The laminate according to the above 8, wherein the substrate is wood selected from maple, birch, camphor, chestnut, figwort, hoop pine, elm, campsis, rose, hinoki, dipterocarp, jambos, fagaceae, pine, legume, and *Osmanthus fragrans*.

12. The laminate according to the above 8, wherein the substrate is a fiber selected from cotton, hemp, linen, wool, silk, cashmere, asbestos, polyamide, polyester, viscose, cellulose, glass, and carbon.

13. The laminate according to any one of the above 8 to 12, wherein a thickness of the film of the coating composition is 0.5 to 50 μm.

Advantageous Effects of the Invention

A coating composition of the present invention has excellent transparency and slidability, and can maintain high abrasion resistance without impairing the appearance of a laminate on which a film of the coating composition is formed. The coating composition is a water-based composition, whereby the coating composition has great advantages in terms of a work aspect and an environment aspect.

DESCRIPTION OF THE PREFERRED EMBODIMENTS

The present invention is a coating composition containing a urethane-based resin emulsion having film-forming ability as a component (A), and a silicone-acrylic graft copolymer resin emulsion having an average particle size of 50 to 180 nm as a component (B), wherein a weight ratio of a polyorganosiloxane represented by the following general formula (1) to an acrylic acid ester unit or a methacrylic acid ester unit is 30:70 to 99:1. The coating composition contains 60 to 99% by weight of the component (A) in terms of a solid content ratio, and 1 to 40% by weight of the component (B) in terms of a solid content ratio. The haze increase rate of the coating composition applied to a substrate is 1000% or less per the haze value of the substrate before the coating composition is applied.

The urethane-based resin emulsion (A) having film-forming ability to be used may be synthesized by a known method, for example, an emulsion polymerization method using an anionic or nonionic emulsifier and the like, or may be a commercially available product. The film-forming ability is the ability to eliminate the particle property of the surface of a coated film after drying at a certain temperature or higher without causing fine cracks and the like during drying. A drying temperature range for forming a film is not particularly limited, but it is preferably 30 to 150° C., and more preferably 100 to 150° C.

Specific examples of the urethane-based resin emulsion of the component (A) include various water-soluble urethane resins obtained from the reaction of a polyisocyanate with a polyol, the polyol being selected from polyether, polycarbonate, polyester polyols, and the like. The urethane-based resin emulsion preferably has a particle size of 10 to 500 nm in order to have film-forming ability. The urethane-based resin emulsion to be used may have a viscosity (25° C.) of 10 to 500 mPa·s. A glass transition temperature (hereinafter, sometimes referred to as Tg) is 120° C. or lower, preferably 60° C. or lower, and more preferably 30° C. or lower. The lower limit of the glass transition temperature is preferably −50° C. The glass transition temperature can be measured based on JIS K7121.

Examples of commercially available polyether-based urethane resin emulsions include Adeka Bontighter HUX-350 manufactured by ADEKA Corporation, WLS-201 and WLS-202 manufactured by DIC Corp., and SuperFlex E-4000 and E-4800 manufactured by DKS Co. Ltd. Examples of polycarbonate-based urethane resin emulsions include Hydran WLS-210 and WLS-213 manufactured by DIC Corp., UW-1005E and UW-5502 manufactured by Ube Industries, Ltd., Permarin UA-368 manufactured by Sanyo Chemical Industries, Ltd., and SuperFlex 460 and SuperFlex 470 manufactured by DKS Co. Ltd. Examples of polyester-based urethane resin emulsions include Adeka Bontighter HUX-380 and HUX-540 manufactured by ADEKA Corporation, and SuperFlex 420 and SuperFlex 860 manufactured by DKS Co. Ltd.

The blending amount of the urethane-based resin emulsion having film-forming ability as the component (A) is 60 to 99% by weight, and preferably 65 to 95% by weight, in terms of a solid content in the coating composition. The resin emulsion of less than 60% by weight causes a problem that film properties such as abrasion resistance are extremely deteriorated. The resin emulsion exceeding 99% by weight causes a problem that the film has an unsmooth surface which gives rough touching.

The silicone-acrylic graft copolymer resin emulsion as the component (B) is preferably obtained by emulsion graft polymerization of a mixture of (b1) a polyorganosiloxane represented by the following general formula (1), (b2) a (meth)acrylic acid ester monomer, and (b3) a functional group-containing monomer copolymerizable therewith.

The silicone-acrylic graft copolymer resin emulsion as the component (B) is preferably obtained using 10 to 100 parts by weight of the component (b2) and 0.01 to 20 parts by weight of the component (b3) per 100 parts by weight of the component (b1), and more preferably obtained using 40 to 100 parts by weight of the component (b2) and 0.01 to 5 parts by weight of the component (b3) per 100 parts by weight of the component (b1).

Here, the polyorganosiloxane (b1) is represented by the following general formula (1):

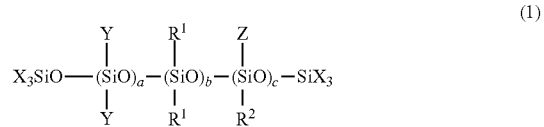

wherein $R^1$ is the same or different substituted or unsubstituted monovalent hydrocarbon group of 1 to 20 carbon atoms, $R^2$ is a mercapto, acryloxy or methacryloxy group-substituted alkyl group having 1 to 6 carbon atoms, or vinyl group, X is the same or different substituted or unsubstituted monovalent hydrocarbon group of 1 to 20 carbon atoms, an alkoxy group having 1 to 20 carbon atoms, or a hydroxyl group, Y is the same or different group represented by X or $—[O—Si(X)_2]_d—X$, at least two of X and Y being hydroxyl groups, Z is an alkyl group having 1 to 4 carbon atoms, an alkoxy group having 1 to 4 carbon atoms, or a hydroxyl group, a is a number of 0 to 1,000, b is a positive number of 100 to 10,000; c is a positive number of 1 to 10, and d is a positive number of 1 to 1,000.

Here, $R^1$ is the same or different substituted or unsubstituted monovalent hydrocarbon group having 1 to 20 carbon atoms. Specific examples thereof include alkyl groups such as methyl, ethyl, propyl, butyl, pentyl, hexyl, heptyl, octyl, nonyl, decyl, dodecyl, tetradecyl, hexadecyl, and octadecyl groups; cycloalkyl groups such as cyclopentyl, cyclohexyl, and cycloheptyl groups; alkenyl groups such as vinyl and allyl groups; aryl groups such as phenyl, tolyl, and naphthyl groups; alkenylaryl groups such as a vinylphenyl group, aralkyl groups such as benzyl, phenylethyl, and phenylpropyl groups; alkenylaralkyl groups such as vinylbenzyl and vinylphenylpropyl groups; and a substituted one in which a part or all hydrogen atoms of the above groups are substituted with a halogen atom such as fluorine, bromine or chlorine, an acryloxy group, a methacryloxy group, a carboxyl group, an alkoxy group, an alkenyloxy group, an amino group, and an alkyl-, alkoxy- or (meth)acryloxy-substituted amino group. $R^1$ is preferably a methyl group.

$R^2$ is a mercapto group, an acryloxy group or a methacryloxy group-substituted alkyl group having 1 to 6 carbon atoms, or a vinyl group. Specifically, mercaptopropyl, acryloxypropyl, methacryloxypropyl, vinyl groups, and the like are preferable.

X is the same or different substituted or unsubstituted monovalent hydrocarbon group having 1 to 20 carbon atoms, an alkoxy group having 1 to 20 carbon atoms, or a hydroxyl group. Examples of the unsubstituted or substituted monovalent hydrocarbon group having 1 to 20 carbon atoms include those exemplified in $R^1$. Specific examples of the alkoxy group having 1 to 20 carbon atoms include methoxy, ethoxy, propoxy, butoxy, hexyloxy, heptyloxy, octyloxy, decyloxy, and tetradecyloxy groups. Preferably, X is a hydroxyl group, a methyl group, a butyl group, or a phenyl group.

Y is the same or different group represented by X or —[O—Si(X)$_2$]$_d$—X.

Z is an alkyl group having 1 to 4 carbon atoms, an alkoxy group having 1 to 4 carbon atoms, or a hydroxyl group, and preferably a hydroxyl group or a methyl group.

The subscript "a" is a number of 0 to 1,000, and preferably 0 to 200, because the strength of a film to be obtained becomes insufficient when "a" exceeds 1,000. The subscript "b" is a positive number of 100 to 10,000, and preferably 1,000 to 5,000, because a film becomes less flexible when b is less than 100 and its tear strength is lowered when b exceeds 10,000. The subscript "c" is a positive number of 1 to 10, because coating fails to improve abrasion resistance if c exceeds 10.

The subscript "d" is a positive number of 1 to 1,000, and preferably 1 to 200. From the viewpoint of crosslinkability, it is preferable to use a polyorganosiloxane having at least 2 hydroxyl groups, and preferably 2 to 4 hydroxyl groups per molecule formed at both ends.

The polyorganosiloxane (b1) is preferably used in an emulsion form, and it may be selected from commercial products or synthesized. Synthesis may be conducted by any known emulsion polymerization methods. For example, the polyorganosiloxane may be readily synthesized by emulsifying and dispersing a cyclic organosiloxane which may have a fluorine atom, a (meth)acryloxy, carboxyl, hydroxyl, or amino group, or an α,ω-dihydroxysiloxane oligomer, an α,ω-dialkoxysiloxane oligomer or an alkoxysilane, and a silane coupling agent represented by the following general formula (2) in water with the aid of an anionic surfactant, and thereafter adding a catalyst such as an acid as necessary, to effect a polymerization reaction:

wherein $R^3$ represents a monovalent organic group having a polymerizable double bond, particularly an acryloxy group or methacryloxy group-substituted alkyl group having 1 to 6 carbon atoms, $R^4$ is an alkyl group having 1 to 4 carbon atoms, $R^5$ is an alkyl group having 1 to 4 carbon atoms, e is an integer of 2 or 3, f is an integer of 0 or 1, and e+f is 2 or 3.

Examples of the cyclic organosiloxane include hexamethylcyclotrisiloxane (D3), octamethylcyclotetrasiloxane (D4), decamethylcyclopentasiloxane (D5), dodecamethylcyclohexasiloxane (D6), 1,1-diethylhexamethylcyclotetrasiloxane, phenylheptamethylcyclotetrasiloxane, 1,1-diphenylhexamethylcyclotetrasiloxane, 1,3,5,7-tetravinyltetramethylcyclotetrasiloxane, 1,3,5,7-tetramethylcyclotetrasiloxane, 1,3,5,7-tetracyclohexyltetramethylcyclotetrasiloxane, tris(3,3,3-trifluoropropyl)trimethylcyclotrisiloxane, 1,3,5,7-tetra(3-methacryloxypropyl)tetramethylcyclotetrasiloxane, 1,3,5,7-tetra(3-acryloxypropyl)tetramethylcyclotetrasiloxane, 1,3,5,7-tetra(3-carboxypropyl)tetramethykcyclotetrasilo- xane, 1,3,5,7-tetra(3-vinyloxypropyl)tetramethylcyclotetrasiloxane, 1,3,5,7-tetra(p-vinylphenyl)tetramethylcyclotetrasiloxane, 1,3,5,7-tetra[3-(p-vinylphenyl)propyl]tetramethylcyclotetrasiloxane, 1,3,5,7-tetra(N-acryloyl-N-methyl-3-aminopropyl)tetramethylcyclotetrasiloxane, and 1,3,5,7-tetra(N,N-bis(lauroyl)-3-aminopropyl)tetramethyl-cyclotetrasiloxane. Preferably, octamethylcyclotetrasiloxane and decamethylcyclopentasiloxane are used.

Specific examples of the silane coupling agent include vinylsilanes such as vinyltrimethoxysilane, vinyltriethoxysilane, vinyltripropoxysilane, vinyltriisopropoxysilane, vinylmethyldimethoxysilane, and vinylmethyldiethoxysilane; acrylsilanes such as γ-(meth)acryloxypropyltrimethoxysilane, γ-(meth)acryloxypropyltriethoxysilane, γ-(meth)acryloxypropyltripropoxysilane, γ-(meth)acryloxypropyltriisopropoxysilane, γ-(meth)acryloxypropyltributoxysilane, γ-(meth)acryloxypropylmethyldimethoxysilane, γ-(meth)acryloxypropylmethyldiethoxysilane, γ-(meth)acryloxypropylmethyldipropoxysilane, γ-(meth)acryloxypropylmethyldiisopropoxysilane, and γ-(meth)acryloxypropylmethyldibutoxysilane; and mercaptosilanes such as γ-mercaptopropylmethyldimethoxysilane and γ-mercaptopropyltrimethoxysilane. In some cases, oligomers obtained from polycondensation of the foregoing may be preferable because the generation of alcohol is suppressed. Here, (meth)acryloxy represents acryloxy or methacryloxy. The silane coupling agent is preferably used in an amount of 0.01 to 10 parts by weight, and more preferably 0.01 to 5 parts by weight per 100 parts by weight of the cyclic organosiloxane. When the amount of the silane coupling agent is less than 0.01 parts by weight, the transparency of the silane coupling agent used as a coating agent is lowered. If the amount of the silane coupling agent exceeds 10 parts by weight, the slidability of the silane coupling agent may not exhibited.

The copolymerization of the silane coupling agent forms a polyorganosiloxane containing units (c) in the following formula, exerting the effect of grafting a monomer of the component (b2) or (b3).

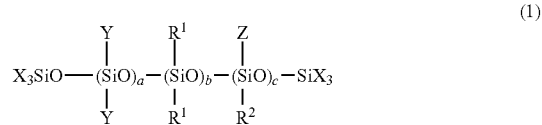

The polymerization catalyst used for polymerization may be any of known polymerization catalysts. Among them, strong acids are preferable, and hydrochloric acid, sulfuric acid, dodecylbenzenesulfonic acid, citric acid, lactic acid, and ascorbic acid are exemplified. Dodecylbenzenesulfonic acid having emulsifying ability is preferable.

The amount of the acid catalyst used is preferably 0.01 to 10 parts by weight, and more preferably 0.2 to 2 parts by weight per 100 parts by weight of the cyclic organosiloxane. Examples of surfactants used for polymerization include anionic stufactants including sodium lauryl sulfate, sodium laureth sulfate, N-acyl amino acid salts, N-acyl taurate salts, aliphatic soaps, and alkyl phosphate salts. Among them, those surfactants which are soluble in water and free of polyethylene oxide chain are preferable. N-acyl amino acid salts, N-acyl taurate salts, aliphatic soaps, and alkyl phosphate salts are more preferable. Sodium methyl lauroyl taurate, sodium methyl myristoyl taurate, and sodium lauryl sulfate are particularly preferable.

The amount of the anionic surfactant used is preferably 0.1 to 20 parts by weight, and more preferably 0.5 to 10 parts by weight per 100 parts by weight of the cyclic organosiloxane.

A polymerization temperature is preferably 50 to 75° C., and a polymerization time is preferably 10 hours or more, and more preferably 15 hours or more. Furthermore, polymerization is particularly preferably followed by aging at 5 to 30° C. for 10 hours or more.

The organopolysiloxane (b1) obtained in this manner is preferably adjusted by known atomization methods such as Star Burst, a high pressure homogenizer, a continuous emulsifier, a colloidal mill, and a kneader such as to have an average particle size of 180 nm or less, preferably 50 to 180 nm, and more preferably 70 to 170 nm. For example, as the atomization condition, a wet atomization method in a pressure of 50 to 300 MPa using Star Burst and the like, and a dispersion treatment using an ultrasonic disperser, preferably an ultrasonic homogenizer can also be performed. The condition of the ultrasonic homogenizer can be set in the range of frequency: 20 to 2,000 kHz×output: 20 to 1,000 W×1 to 10 hours. The acrylic or methacrylic acid ester (b2) used in the present invention (hereinafter, sometimes referred to as an acrylic component) refers to an acrylic acid ester monomer or a (meth)acrylic acid ester monomer free of a functional group such as hydroxyl, amide or carboxyl group. An acrylic ester or methacrylic ester having 1 to 10 carbon atoms alkyl group is preferable. Furthermore, monomers whose polymer of the acrylic component has a glass transition temperature (hereinafter, sometimes referred to as Tg) of 40° C. or higher, preferably 60° C. or higher are preferable. Examples of the monomers include methyl methacrylate, isopropyl methacrylate, ethyl methacrylate, and cyclohexyl methacrylate. The upper limit of Tg is preferably 200° C. or lower, and more preferably 150° C. or lower. The glass transition temperature can be measured based on JIS K7121.

The functional group-containing monomer (b3) copolymerizable with the component (b2) is a monomer having an unsaturated bond containing a carboxyl, amide, hydroxyl, vinyl, or allyl group. Specific examples thereof include methacrylic acid, acrylic acid, acrylamide, allyl methacrylate, vinyl methacrylate, 2-hydroxyethyl methacrylate, and 2-hydroxypropyl methacrylate. By copolymerizing these monomers, the compatibility can be improved.

The silicone-acrylic graft copolymer resin emulsion (B) of the present invention is obtained from emulsion graft polymerization of a mixture of the polyorganosiloxane (b1) obtained as described above, the (meth)acrylic acid ester monomer (b2), and the functional group-containing monomer copolymerized therewith (b3).

On graft polymerization, the weight ratio of the polyorganosiloxane of the formula (1) to the (meth)acrylic acid ester monomer (the weight ratio of the polyorganosiloxane of the formula (1) to the (meth) acrylic unit) is 30:70 to 99:1, and preferably 60:40 to 99:1. If the amount of the silicone component is less than 30, a coating fails to improve abrasion resistance.

Examples of the radical initiator used herein include persulfates such as potassium persulfate and ammonium persulfate, aqueous hydrogen persulfate, t-butyl hydroperoxide, and hydrogen peroxide. If necessary, a redox system combined with reducing agents such as acidic sodium sulfite, Rongalite, L-ascorbic acid, tartaric acid, saccharides, and amines may also be used.

Although the surfactant already contained in the polyorganosiloxane emulsion is sufficient for graft polymerization to take place, anionic surfactants such as sodium lauryl sulfate, sodium laureth sulfate, N-acyl amino acid salts, N-acyl taurate salts, aliphatic soaps, and alkyl phosphate salts may be added to improve stability. Nonionic emulsifiers such as polyoxyethylene lauryl ether andpolyoxyethylene tridecyl ether may also be added.

Graft polymerization temperatures of the components (b2) and (b3) with respect to the component (b1) are preferably 25 to 55° C., and more preferably 25 to 40° C. A polymerization time is preferably 2 to 8 hours, and more preferably 3 to 6 hours.

Furthermore, a chain transfer agent may be added to adjust the molecular weight and graft ratio of a graft polymer.

The silicone-acrylic graft copolymer resin emulsion (B) thus obtained is a polymer in which the components (b2) and (b3) are randomly grafted.

The solid content of the silicone-acrylic graft copolymer resin emulsion which is the component (B) is preferably 35 to 50% by weight. The viscosity (25° C.) of the silicone-acrylic graft copolymer resin emulsion is preferably 500 mPa·s or less, and more preferably 50 to 500 mPa·s. The viscosity can be measured by a rotational viscometer. The average particle size of the silicone-acrylic graft copolymer resin emulsion is 180 nm or less, preferably 50 nm to 180 nm, and more preferably 80 to 170 nm. If the average particle diameter is too large, a transparent coating agent cannot be obtained, and if the average particle diameter is too small, the dispersibility of the silicone-acrylic graft copolymer resin emulsion is disadvantageously deteriorated. The average particle size can be measured by a laser diffraction/scattering type particle size distribution analyzer.

The blending amount of the silicone-acrylic graft copolymer resin emulsion which is the component (B) is 1 to 40% by weight, and preferably 5 to 30% by weight in terms of solid content in the coating composition. The silicone-acrylic graft copolymer resin emulsion of less than 1% by weight fails to achieve an improvement in abrasion resistance, whereas the silicone-acrylic graft copolymer resin emulsion exceeding 50% by weight disadvantageously causes whitening and deteriorated abrasion resistance.

The coating composition of the present invention is obtained by mixing the urethane-based resin emulsion having film-forming ability (A) and the silicone-acrylic graft copolymer resin emulsion (B) in water through any known mixing preparation methods such as a propeller stirrer or homogenizer.

To the coating composition of the present invention, antioxidants, coloring agents, UV absorbers, photo-stabilizers, antistatic agents, plasticizers, flame retardants, thickeners, surfactants, organic solvents serving as auxiliary film former, other resins, and the like may be added as long as its properties are not compromised.

In the coating composition of the present invention, from the viewpoint of securing desired high transparency, the haze increase rate when coating composition is applied to the substrate is suitably 1000% or less per the haze value of the substrate before the application, and more preferably 500% or less, depending on the type of the substrate. The "haze" referred to in the present invention is HAZE (fogging value) calculated by the following formula from the total light transmittance and the diffuse transmittance according to the standard of JIS K7136 (2000).

HAZE(fogging value)=(diffuse transmittance $T_d$/total light transmittance $T_t$)×100(%)

The haze value of the coating composition applied to the substrate can be measured, for example, by a haze meter manufactured by Nippon Denshoku Industries Co., Ltd. The haze value of the substrate before the application of the coating composition can also be measured according to the same standard as described above. The "haze increase rate" referred to in the present invention can be represented by

[Increase rate of haze value (%)]=[(Y–X)/X]×100 when the haze value of the substrate is taken as X, and the haze value after the application of the coating composition is taken as Y.

When the coating composition of the present invention thus obtained is applied or immersed, and dried (room temperature to 150° C.) on one surface or both surfaces of a substrate such as a plastic (PET, PI, synthetic leather and the like), glass (general purpose glass, $SiO_2$ and the like), a metal (Si, Cu, Fe, Ni, Co, Au, Ag, Ti, Al, Zn, Sn, Zr, alloys thereof, and the like), wood, a fiber (cloth, yarn and the like), paper, ceramics (baked products such as oxides, carbides, and nitrides), advantages such as water repellency, weather resistance, heat resistance, cold resistance, gas permeability, and sliding properties of the silicone resin while the merits of the resin are maintained can be imparted over a long period of time. This is considered to be because the resin having film-forming ability and the curable silicone resin form a strong sea-island structure.

Here, as the plastic substrate, poly(meth)acrylic esters such as polymethyl methacrylate, polycarbonate, polystyrene, polyethylene terephthalate, polyvinylchloride, polyester, cellulose, a diethylene glycol bis allyl carbonate polymer, an acrylonitrile-butadiene-styrene polymer, polyurethane, an epoxy resin, and the like are used. Examples of plastic processed products include automobile interior materials and organic glass, electric materials and building materials, exterior materials for buildings, optical films used for liquid crystal displays and the like, light diffusion films, mobile phones, home appliances, and the like. Examples of a drying method include a method of leaving the substrate at room temperature for 1 to 10 days, and a method of heating the substrate at a temperature of 20 to 150° C. for 1 second to 10 hours is preferable from the viewpoint of rapidly promoting curing. If the plastic substrate is made of a material that is apt to be deformed or discolored by heating, the plastic substrate is preferably dried at a relatively low temperature of 20 to 100° C.

As the glass substrate, soda lime glass, quartz glass, lead glass, borosilicate glass, alkali-free glass, and the like are used. Examples of glass processed products include plate glass for construction, glass for vehicles such as automobiles, glass for lenses, glass for mirrors, glass for display panels, and glass for solar cell modules. As a drying method, a method of leaving the substrate at room temperature for about 1 to 10 days or heating the substrate at a temperature of 20 to 150° C., and particularly 60 to 150° C. for 1 second to 10 hours is preferable.

As the wood substrate, woods such as maple, birch, camphor, chestnut, figwort, hoop pine, elm, campsis, rose, hinoki, dipterocarp, jambos, fagaceae, pine, legume, and *Osmanthus fragrans* are used. The wood processed product may be selected from processed and molded products made of wood itself, laminated wood and bonded wood, processed and formed products thereof, and combinations thereof. Examples thereof include housing and construction materials including exterior and interior materials for buildings, furniture such as desks, wooden toys, and musical instruments. A hot-air drying method at 20 to 150° C., and particularly 50 to 150° C. for 0.5 to 5 hours is preferable. If a drying temperature is 120° C. or lower, the discoloration of a coated film can be avoided.

Examples of the fiber substrate include natural fibers such as cotton, hemp, linen, wool, silk, cashmere, and asbestos, and chemical fibers such as polyamide, polyester, viscose, cellulose, glass, and carbon. Examples of the fiber processed products include all kinds of woven fabrics, knitted fabrics, non-woven fabrics, films, and papers. The drying method is preferably a method of leaving the substrate at room temperature for 10 minutes to several tens of hours, or a method of drying the substrate at a temperature of 20 to 150° C. for 0.5 minutes to 5 hours.

The method for coating the coating composition of the present invention on the substrate is not particularly limited, and examples thereof include coating methods using various coaters such as a gravure coater, a bar coater, a blade coater, a roll coater, an air knife coater, a screen coater, a curtain coater, and a brush, spraying coating, and immersing.

The coating amount of the coating composition of the present invention to the substrate is not particularly limited, but usually, from the viewpoints of antifouling properties and construction workability and the like, the coating composition may be formed such that the coating amount is preferably 1 to 300 g/m², and more preferably 5 to 100 g/m² in terms of a solid content, or in a thickness of 1 to 500 μm, and preferably 5 to 100 μm, and naturally dried or dried by heating at 100 to 200° C. to form a film.

EXAMPLES

Hereinafter, the present invention is specifically described below with reference to Production Examples, Examples, and Comparative Examples, but the present invention is not limited to the following Examples. In the following Examples, parts and % indicate parts by weight and % by weight, respectively.

Production Example 1

A 2-L polyethylene beaker was charged with a solution of 600 g of octamethylcyclotetrasiloxane, 0.6 g of γ-methacryloxypropyhnethyldiethoxysilane, and 12 g of sodium lauryl sulfate in 108 g of ion-exchanged water, and a solution of 6 g of dodecylbenzenesulfonic acid in 54 g of pure water. The mixture was uniformly emulsified by a homomixer, diluted by slowly adding 450 g of ion-exchanged water, and passed twice through a high-pressure homogenizer under a pressure of 300 kgf/cm² to obtain a uniform white emulsion. Furthermore, after the emulsion was treated with Star Burst (Sugino Machine Limited) twice at 100 MPa, the emulsion was transferred to a 2-L glass flask equipped with a stirrer, a thermometer, and a reflux condenser where a polymerization reaction took place at 50 to 70° C. for 24 hours. The emulsion was neutralized to pH 6 to 8 with 12 g of a 10% aqueous sodium carbonate solution. The silicone emulsion had a nonvolatile content of 45.4% after drying at 105° C. for 3 hours, and the organopolysiloxane in the emulsion was a non-flowing soft gel. To the emulsion, 238 g of methyl methacrylate (MMA) was added dropwise over 3 to 5 hours, during which redox reaction was conducted by a peroxide and a reducing agent at 30° C., thereby effecting acrylic graft copolymerization to silicone, to obtain a silicone-acrylic graft copolymer resin emulsion having a nonvolatile content of 44.8%.

Production Examples 2 to 5, Comparative Production Examples 1 to 3

A silicone-acrylic graft copolymer resin emulsion was prepared in the same manner as in Production Example 1 according to the blending ratios shown in Table 1.

Comparative Production Example 4

According to the blending ratios shown in Table 1, a silicone emulsion was prepared in the same manner as in Production Example 1. No acrylic grafting reaction was performed.

The characteristics of the emulsion obtained in each of the above Production Examples and Comparative Production Examples are shown in Table 1. Each measurement was performed as follows.

Evaporation Residue (Solid Content Concentration) Measurement

About 1 g of a sample was weighed in an aluminum foil dish, which was placed in a dryer kept at 105 to 110° C., heated for 1 hour, taken out of the dryer, and placed in a desiccator where the sample was allowed to cool. The weight of the sample after drying was measured. An evaporation residue was calculated according to the following formula:

$$R = \frac{T - L}{W - L} \times 100$$

R: Evaporation residue (%)
W: weight (g) of aluminum foil dish containing sample before drying
L: weight (g) of aluminum foil dish
T: weight (g) of aluminum foil dish containing dried sample
Dimension of aluminum foil dish: 70φ×12 h (mm)

Average Particle Size Measurement 0.01 g of the sample was weighed, and an average particle size under conditions of a circulation flow rate 2 and a stirring speed 2 (a particle size value corresponding to 50% of particle size cumulative distribution) was measured using a laser diffraction particle size distribution analyzer (trade name: LA-950V2 manufactured by Horiba, Ltd.).

Measurement Conditions

Measurement temperature: 25±1° C.
Solvent: ion-exchanged water

TABLE 1

| | Production Example | | | | | Comparative Production Example | | | |
|---|---|---|---|---|---|---|---|---|---|
| | 1 | 2 | 3 | 4 | 5 | 1 | 2 | 3 | 4 |
| Production of silicone emulsion | | | | | | | | | |
| D4 | 100 | 100 | 100 | 100 | 100 | 100 | 100 | 100 | 100 |
| KBM-502 | 0.1 | 0.1 | 0.1 | 0.1 | 0.1 | 0.1 | 0.1 | 0.1 | 0.1 |
| Sodium lauryl sulfate | 2 | 4 | 4 | 4 | 4 | 1 | 1 | 1 | 1 |
| Dodecylbenzenesulfonic acid | 1 | 1 | 1 | 1 | 1 | 1 | 1 | 1 | 1 |
| Starburst treatment | Presence | Absence | Presence | Presence | Presence | Presence | Absence | Absence | Absence |
| Average particle diameter (nm) | 170 | 150 | 120 | 120 | 120 | 210 | 200 | 200 | 200 |
| Solid content (%) | 45 | 45 | 45 | 45 | 45 | 45 | 45 | 45 | 45 |
| pH | 6.7 | 6.8 | 6.8 | 7.1 | 6.8 | 6.9 | 7.0 | 6.8 | 7.0 |
| Production of silicone-acrylic graft copolymer resin emulsion | | | | | | | | | |
| Above-mentioned siloxane | 70 | 70 | 70 | 50 | 70 | 70 | 70 | 25 | None |
| MMA | 30 | 30 | 30 | 50 | | 30 | 30 | 75 | |
| BA | | | | | 30 | | | | |
| Average particle diameter (nm) | 180 | 160 | 130 | 140 | 140 | 240 | 230 | 320 | |
| Solid content (%) | 45 | 45 | 45 | 45 | 45 | 45 | 45 | 45 | |

* All used materials are represented by parts by weight.
D4: Octamethylcyclotetrasiloxane
KBM-502: γ-(meth)acryloxypropylmethyldimethoxysilane manufactured by Shin-Etsu Chemical Co., Ltd.
MMA: Methyl methacrylate
BA: Butyl acrylate

Example 1

Product name "Permarine UA-368" (viscosity: 200 mPa·s (25° C.), average particle diameter: 300 nm, solid content: about 5 wt %) manufactured by Sanyo Chemical Industries, Ltd. was used as a polycarbonate-based polyurethane resin emulsion. While the resin emulsion was stirred, the silicone-acrylic graft copolymer resin emulsion obtained in Production Example 1 was charged into the resin emulsion, followed by stirring for 10 minutes or more. The stirred product was then filtered through 80 mesh, to obtain a coating composition of Example 1.

Examples 2 to 7, Comparative Examples 1 to 6

Coating compositions of examples were prepared in the same manner as in Example 1 according to the blending ratios of components shown in Table 2 (Examples 2 to 7) and Table 3 (Comparative Examples 1 to 6). The raw material ratio shown in Tables 2 and 3 is a weight ratio in a solid content.

The "haze value and haze increase rate" and the "static and dynamic friction coefficients" of the obtained coating composition of each of Examples and Comparative Examples were measured. The numerical values are shown in Tables 2 and 3. Each measurement was performed as follows.

Film Formation Method

Slide Glass, PET Film, Acrylic Plate

The coating composition of each example was applied by a bar coater, and dried at 105° C. for 3 minutes, to form a coated film on each of substrates of a slide glass, a PET film, and an acrylic plate so as to have a thickness of about 23 μm in a dry state.

Measurement of Haze Value

The haze value of the substrate including the coated film of the coating composition of each of the above examples was measured with "Haze meter NDH 7000" (product name) (manufactured by Nippon Denshoku Kogyo Co., Ltd.).

A preferable range of the haze value for the glass slide (haze value: 0.70%) is 0.7 to 6.0%.
A preferable range of the haze value for the PET film (haze value: 11%) is 11.0 to 14.0%.
A preferable haze value of the haze value for the acrylic plate (haze value: 0.20%) is 0.2 to 3.0%.

Haze Increase Rate

The haze increase rate is determined by the following formula. If the increase rate of the haze value is 1000% or less, the transparency can be determined to be high. Meanwhile, if the increase rate of the haze value exceeds 1000%, the transparency of the laminate deteriorates, and the laminate looks whitish.

"Haze value increase rate (%)"=$[(Y-X)/X]\times 100$

X: haze value of substrate
Y: Haze value after application of coating composition

Measurement of Static and Dynamic Friction Coefficients

A frictional force when a metal indenter of 200 g was vertically brought into contact with the coated film of each of the examples, and the metal indenter was moved at 3 cm/min was measured with HEIDON TYPE-38 (manufactured by Shinto Scientific Co., Ltd.), and a friction coefficient was calculated from the frictional force.

Preferable ranges of the static and dynamic friction coefficients of the slide glass are respectively 0.01 to 0.05 and 0.01 to 0.03.

Preferable ranges of the static and dynamic friction coefficients of the PET film are respectively 0.01 to 0.10 and 0.01 to 0.05.

Preferable ranges of the static and dynamic friction coefficients of the acrylic plate are respectively 0.01 to 0.10 and 0.01 to 0.05.

TABLE 2

| Composition: parts by weight | | Example | | | | | | |
|---|---|---|---|---|---|---|---|---|
| | | 1 | 2 | 3 | 4 | 5 | 6 | 7 |
| Permarine UA-368 (Urethane resin emulsion) | | 90 | 90 | 90 | 90 | 90 | 80 | 70 |
| Production Example 1 | | 10 | | | | | 20 | 30 |
| Production Example 2 | | | 10 | | | | | |
| Production Example 3 | | | | 10 | | | | |
| Production Example 4 | | | | | 10 | | | |
| Production Example 5 | | | | | | 10 | | |
| Comparative Production Example 1 | | | | | | | | |
| Comparative Production Example 2 | | | | | | | | |
| Comparative Production Example 3 | | | | | | | | |
| Slide glass | Haze value (%) | 5.0 | 3.6 | 3.2 | 2.8 | 3.0 | 3.2 | 3.4 |
| | Haze increase rate (%) | 614 | 414 | 357 | 300 | 329 | 357 | 385 |
| | Static friction coefficient | 0.04 | 0.04 | 0.03 | 0.04 | 0.04 | 0.04 | 0.03 |
| | Dynamic friction coefficient | 0.02 | 0.02 | 0.01 | 0.02 | 0.02 | 0.02 | 0.01 |
| PET film | Haze value (%) | 12.2 | | | | | | |
| | Haze increase rate (%) | 11 | | | | | | |
| | Static friction coefficient | 0.06 | | | | | | |
| | Dynamic friction coefficient | 0.02 | | | | | | |
| Acrylic plate | Haze value (%) | 2.0 | | | | | | |
| | Haze increase rate (%) | 900 | | | | | | |
| | Static friction coefficient | 0.08 | | | | | | |
| | Dynamic friction coefficient | 0.04 | | | | | | |

TABLE 3

| Composition: parts by weight | Comparative Example 1 | 2 | 3 | 4 | 5 | 6 |
|---|---|---|---|---|---|---|
| Permarine UA-368 (Urethane resin emulsion) | 100 | 90 | 90 | 90 | 45 | 90 |
| Production Example 1 | | | | | 55 | |
| Production Example 2 | | | | | | |
| Production Example 3 | | | | | | |
| Production Example 4 | | | | | | |
| Production Example 5 | | | | | | |
| Comparative Production Example 1 | | 10 | | | | |
| Comparative Production Example 2 | | | 10 | | | |
| Comparative Production Example 3 | | | | 10 | | |
| Comparative Production Example 4 | | | | | | 10 |
| Slide glass  Haze value (%) | 0.9 | 9.6 | 9.2 | 7.8 | 8.5 | 8.7 |
| Haze increase rate (%) | 29 | 1,271 | 1,214 | 1,014 | 1,114 | 1,143 |
| Static friction coefficient | 0.88 | 0.09 | 0.10 | 0.42 | 0.12 | 0.09 |
| Dynamic friction coefficient | 0.57 | 0.04 | 0.04 | 0.20 | 0.06 | 0.04 |
| PET film  Haze value (%) | 11.5 | 17.5 | | | | |
| Haze increase rate (%) | 5 | 59 | | | | |
| Static friction coefficient | 0.75 | 0.20 | | | | |
| Dynamic friction coefficient | 0.43 | 0.05 | | | | |
| Acrylic plate  Haze value (%) | 1.4 | 6.3 | | | | |
| Haze increase rate (%) | 600 | 3,050 | | | | |
| Static friction coefficient | 0.51 | 0.15 | | | | |
| Dynamic friction coefficient | 0.4 | 0.09 | | | | |

Japanese Patent Application No. 2018-186635 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A coating composition comprising:
   (A) a urethane-based resin emulsion having film-forming ability; and
   (B) a silicone-(meth)acrylic graft copolymer resin emulsion having an average particle size of 180 nm or less, wherein a weight ratio of a polyorganosiloxane represented by the following general formula (1) to an acrylic acid ester unit or a methacrylic acid ester unit is 30:70 to 99:1,

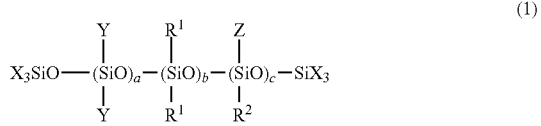

(1)

wherein $R^1$ is the same or different substituted or unsubstituted monovalent hydrocarbon group of 1 to 20 carbon atoms, $R^2$ is a mercapto, acryloxy or methacryloxy group-substituted alkyl group having 1 to 6 carbon atoms, or vinyl group, X is the same or different substituted or unsubstituted monovalent hydrocarbon group of 1 to 20 carbon atoms, an alkoxy group having 1 to 20 carbon atoms, or a hydroxyl group, Y is the same or different group represented by X or —[O—Si$(X)_2]_d$—X, at least two of X and Y being hydroxyl groups, Z is an alkyl group having 1 to 4 carbon atoms, an alkoxy group having 1 to 4 carbon atoms, or a hydroxyl group, a is a number of 0 to 1,000, b is a positive number of 100 to 10,000; c is a positive number of 1 to 10, and d is a positive number of 1 to 1,000,
   wherein 60 to 99% by weight of the solid content of the coating composition is the urethane-based resin emulsion, with the balance of the solid content being the silicone-(meth)acrylic graft copolymer resin emulsion.

2. The coating composition according to claim 1, wherein the monovalent hydrocarbon group of $R^1$ and X each is a straight, branched or cyclic alkyl group having 1 to 20 carbon atoms or aryl group having 6 to 20 carbon atoms in the general formula (1).

3. The coating composition according to claim 1, wherein an average particle diameter of the silicone-(meth)acrylic graft copolymer resin emulsion (B) is 50 to 180 nm.

4. The coating composition of claim 1, wherein the silicone-(meth)acrylic graft copolymer resin emulsion (B) is an emulsion graft copolymer of (b1) a polyorganosiloxane having an average particle size of 180 nm or less, and represented by the general formula (1), (b2) an acrylic acid ester monomer or a methacrylic acid ester monomer, and (b3) a functional group-containing monomer copolymerizable therewith.

5. The coating composition according to claim 4, wherein the average particle size of the polyorganosiloxane represented by the general formula (1) is 50 to 180 nm.

6. The coating composition according to claim 1, wherein a haze increase rate when the coating composition is applied to a substrate is 1000% or less per a haze value of the substrate before the application.

7. The coating composition according to claim 1, wherein the coating composition is used for coating a surface of a substrate.

8. A laminate, comprising:
   a substrate, and
   a film comprising the coating composition according to claim 1,
   wherein the substrate is one selected from the group consisting of a plastic substrate, a glass substrate, a wood substrate, and a fiber substrate, wherein the plastic substrate is one selected from the group consisting of polycarbonate, polystyrene, polyethylene terephthalate, polyvinyl chloride, polyester, cellulose, diethylene glycol bisallyl carbonate polymer, acrylonitrile-butadiene-styrene polymer, poly(meth) acrylic ester, polyurethane, and epoxy resin, wherein the glass substrate is one selected from the group consisting of soda lime glass, quartz glass, lead glass, borosilicate glass, and alkali-free glass, wherein the wood substrate is one selected from the group consisting of maple, birch, camphor, chestnut, figwood, hoop pine, elm, campsis, rose, hinoki, dipterocarp, jambos, fagaceae, pine, legume, and *Osmanthus fragrans*, and wherein the fiber substrate is one selected from the group consisting of cotton, hemp, linen, wool, silk, cashmere, asbestos, polyamide, polyester, viscose, cellulose, glass fiber, and carbon fiber.

9. The laminate according to claim 8, wherein a thickness of the film is from 0.5 to 50 μm.

10. The laminate according to claim 8, wherein the coating composition is applied at an amount of from 1 to 300 g/m$^2$.

* * * * *